Jan. 23, 1923.

R. P. BROWN.
FURNACE REGULATING APPARATUS.
ORIGINAL FILED JULY 31, 1918.

Inventor
Richard P Brown
By Chambers & Hubbell
his Attorneys

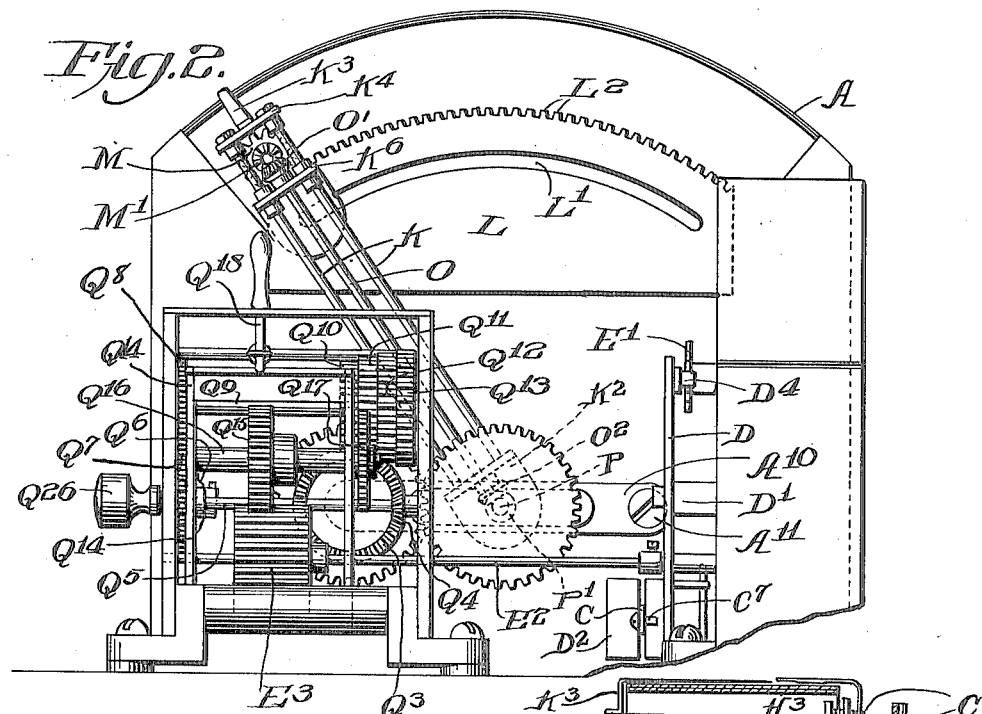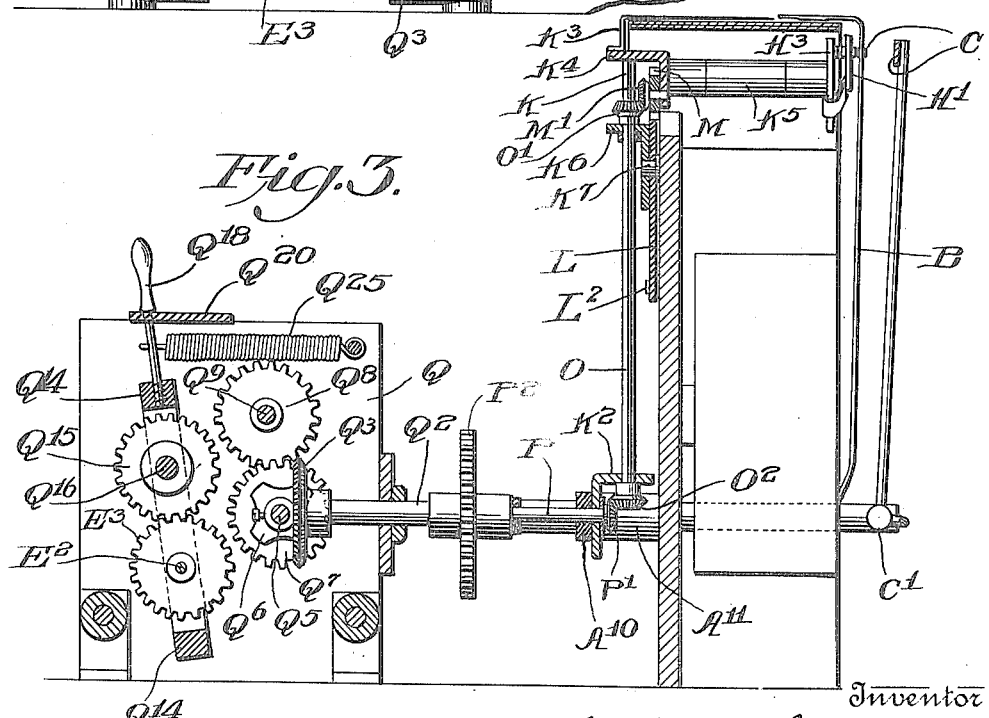

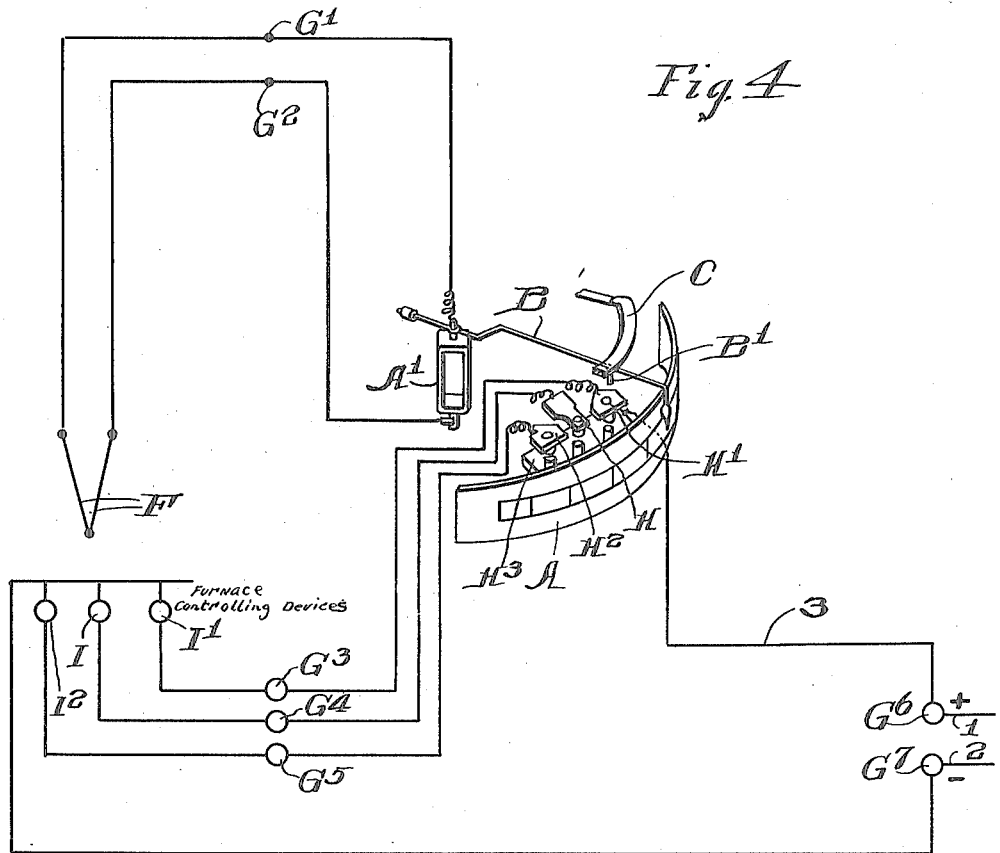
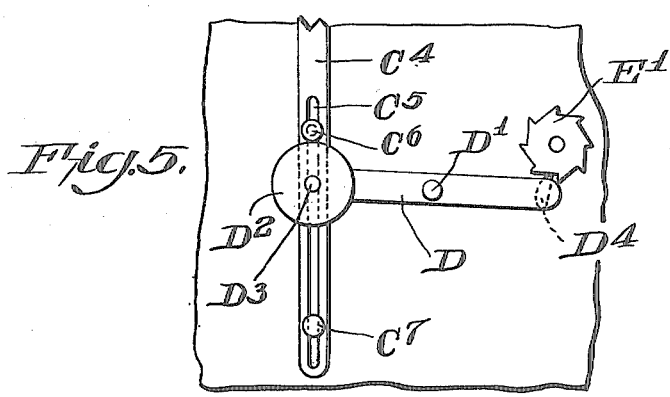

Patented Jan. 23, 1923.

1,443,166

UNITED STATES PATENT OFFICE.

RICHARD P. BROWN, OF PHILADELPHIA, PENNSYLVANIA, ASSIGNOR TO THE BROWN INSTRUMENT COMPANY, OF PHILADELPHIA, PENNSYLVANIA, A CORPORATION OF PENNSYLVANIA.

FURNACE-REGULATING APPARATUS.

Application filed July 31, 1918, Serial No. 247,703. Renewed May 10, 1920. Serial No. 380,400.

*To all whom it may concern:*

Be it known that I, RICHARD P. BROWN, a citizen of the United States of America, and resident of the city and county of Philadelphia, in the State of Pennsylvania, have invented certain new and useful Improvements in Furnace-Regulating Apparatus, of which the following is a true and exact description, reference being had to the accompanying drawings, which form a part thereof.

The general object of my present invention is to provide improvements in furnace regulating apparatus, and more specifically, the object of my invention is to provide simple and effective means for use in automatically varying a furnace temperature at a predetermined rate.

In the preferred mode of carrying out my invention I employ a thermo-electric device such as a thermo-couple responsive to the furnace temperature, and an electric meter, which, in conjunction with the thermo-couple, measures the furnace temperature. I associate with a movable index carried by the meter a contact device which is movable along the path of the index and provide means for automatically advancing the contact device along the path of the index at a predetermined rate of travel. The meter index and the movable control device may cooperate to regulate the furnace temperature in any suitable manner. For example, they may operate a simple signal device or devices, such as electric lamps or bells, to indicate to the furnace attendant the necessity for normally adjusting the switches or valves by which the furnace temperature is manually regulated, or they may directly actuate control switches or valves and thereby automatically and directly vary the furnace temperature as required. Preferably my improved apparatus comprises means for adjusting the rate at which a furnace temperature may be progressively varied, and also has provisions whereby the apparatus may be used in maintaining a constant furnace temperature when this is desired.

The various features of novelty which characterize my invention are pointed out with particularity in the claims annexed to and forming a part of this specification. For a better understanding of the invention, however, and the advantages possessed by it reference should be had to the accompanying drawings and descriptive matter in which I have illustrated a preferred embodiment of the invention.

Of the drawings:

Figure 2 is an inverted plan view of the apparatus shown in Fig. 1.

Figure 3 is a section on line 3—3 of Fig. 1.

Figure 4 is a diagram illustrating electrical circuit connections in the apparatus shown in Figs. 1, 2 and 3, and Figure 5 is a partial section on the line 5—5 of Figure 1.

Figure 1:
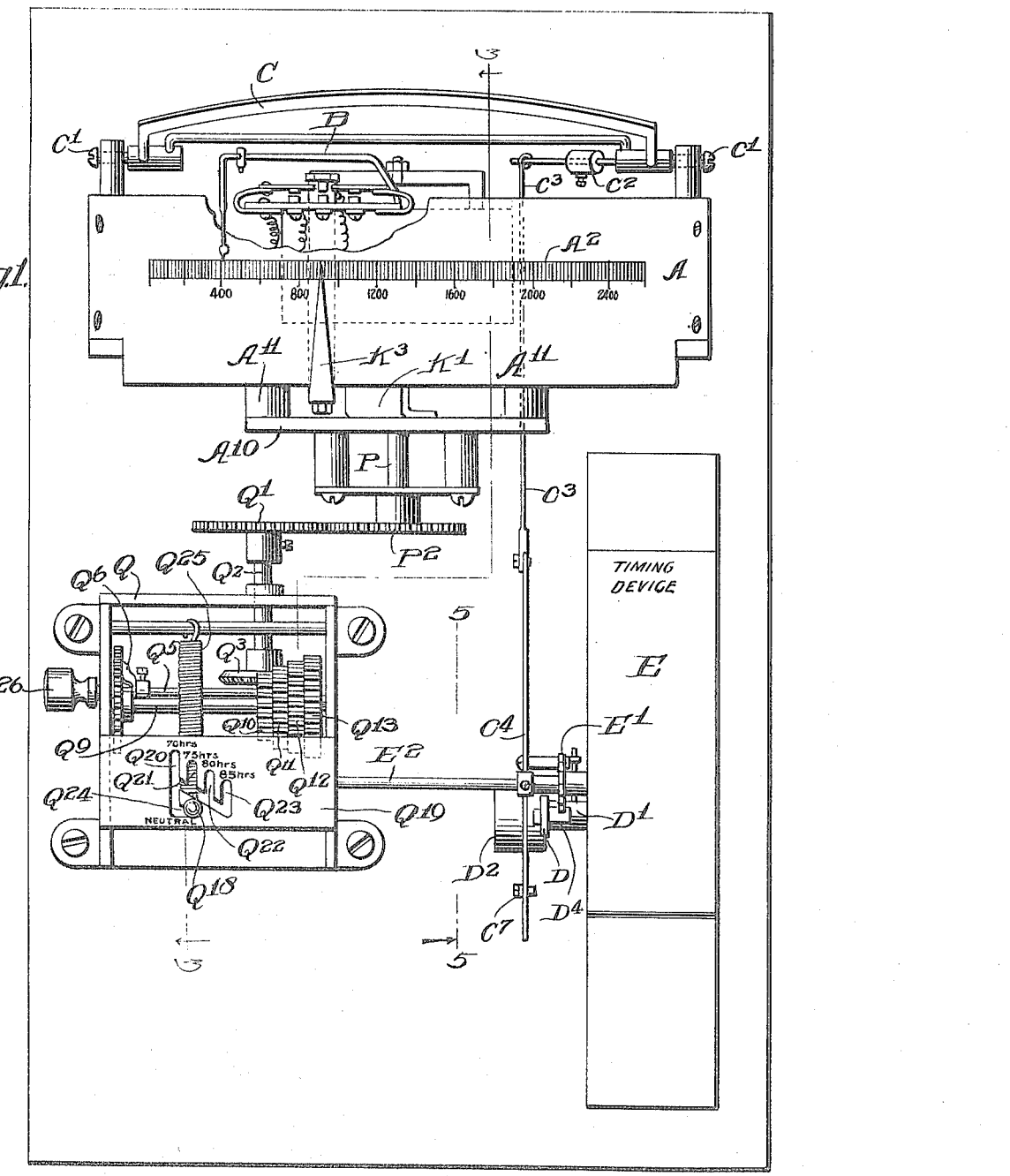
Figure 1 is an elevation of a meter and associated control apparatus.

In the drawings, A represents an electric meter, the movable element A' of which is pivoted and carries an index or pointer B, the downturned outer end of which swings over a scale $A^2$. The pointer B is depressed at intervals to engage a contact device, as hereinafter explained, by a boom or depresser C supported on trunnion pivots C' and carrying a counter weight $C^2$ normally holding the boom out of engagement with the index B. A link connection $C^3$ and $C^4$ connects the counterweight carrying arm of the boom to an operating lever D, which is fulcrumed at D' and carries counterweights $D^2$ at one side of the fulcrum D', tending to hold the lever D in the position in which the tooth $D^4$ carried at the other end of the lever bears against the teeth of a ratchet wheel E', which is constantly rotated by a clock or equivalent timing device E. The link $C^4$ is formed with a slot through which passes the stud $D^3$ by which the counterweights $D^2$ are secured to the lever D. Contactors $C^6$ and $C^7$ limit the movement of the link connection $C^3$ and $C^4$ relative to the lever D, and the arrangement is such that as the rotation of the ratchet wheel E' brings the high point of one of the ratchet teeth against the tooth $D^4$ of the lever D, the latter is oscillated and raises the link connection $C^3$ and $C^4$ through the actuator $C^5$ to thereby depress the boom C into engagement with the meter index B and bend the latter downward.

A suitable thermo-electric device, as a thermo-couple F, responsive to the temperature of the furnace to be controlled, has its terminals connected to the meter binding posts G' and $G^2$, to which the terminals of the winding of the movable element A' of the meter are connected. Mounted in the meter frame is a contact device which is adjustable along the path of the meter index B and comprises, in the form illustrated, a contact plate H³ and three contact elements H, H' and H² spring supported from the contact plate H³ but normally out of electrical contact therewith. When the needle B is above one of the movable contacts H, H' or H², and is depressed by the actuation of the boom C, the corresponding movable contact is forced into engagement with the contact plate H³. Preferably, as shown, the index B carries a lug or projection B' which directly engages the movable contacts H, H' and H². The contact plate H³ is connected by the conductor 3 to meter a binding post G⁶, and the movable contacts H' H and H² are connected respectively to the binding posts G³, G⁴ and G⁵. Three furnace control elements I, I' and I² which may be simple indicating devices, as electric lamps or bells, or may be electromagnetic furnace switch, or furnace fuel valve controlling devices, each has one terminal connected by a common conductor 4 to a meter binding post G⁷. The second terminal of the control element I is connected to the binding post G⁴; the second terminal of the control element I' is connected to the binding post G³, and the second terminal of the furnace control element I² is connected to the binding post G⁵. The binding posts G⁶ and G⁷ are energized by conductors 1 and 2, respectively, leading from a suitable source of electric current.

With the mechanism so far described whenever the boom C is depressed, the corresponding movable contact H, H' or H² then adjacent the index B, is moved into engagement with the contact plate H³, and thereby closes a circuit between the binding posts G⁶ and G⁷, through the conductor 3 contact plate H³, whichever of the movable contacts H, H' or H² is in engagement with the latter, the conductor running from the movable contact to the corresponding binding posts G³, G⁴ or G⁵, the furnace control element I, I' or I² connected to that binding post, and the conductor 4.

The contact plate H³ is carried by a post K⁵ secured to the outer end of an arm comprising, as shown, rods K secured at their inner ends to a bracket or cross head member K² and secured at their outer ends to a bracket or cross head member K⁴ and to a bracket or cross head member K⁶. The bracket K² is journalled on a shaft P, the axis of which is preferably, as shown, coaxial, with the movable element A' of the meter. The shaft P is shown as journalled in a bracket A¹⁰ secured to the meter frame proper by posts A¹¹. The shaft P carries a bevel gear P' in mesh with the bevel gear O² carried by the adjacent end of a shaft O which is parallel to the rods K and is journalled at its ends in the cross head or bracket members K² and K⁶. At its outer end the shaft O carries a bevel gear O' in mesh with a bevel gear M' journalled on the cross head K⁴ and rigidly connected to a spur gear M which is in mesh with the teeth L² of a stationary gear segment L, the center of curvature of the gear segment L being coaxial with the shaft P. The gear segment L, as shown, is formed with an arcuate slot L', receiving the guide pin K⁷ carried by the bracket K⁶. It will be apparent that when the shaft P is rotated the spur gear M will be correspondingly rotated, and the engagement of the latter with the teeth L² of the gear segment L will cause the arm K to turn about the axis of the shaft P and thereby move the contact plate H³ and the movable contact H, H' and H² supported by it along the path of the index B.

The shaft P in the form of the apparatus disclosed is connected to a driving shaft E² of the timing device E by a change speed gear-controlling device, which I designate collectively by the symbol Q. The illustrated construction of the device Q and its connection to the shafts P and E² is as follows:

The shaft P carries at its outer end a spur gear P² in mesh with a spur gear Q' carried by a shaft Q² journalled in the frame of the device Q. At its inner end the shaft Q² carries a bevel gear Q³ in mesh with the bevel gear Q⁴, carried by a countershaft Q⁵. The latter carries a spur gear Q⁷, which is yieldingly connected to the shaft Q⁵ by means of the friction clutch member Q⁶. The gear Q⁷ is in mesh with a gear Q⁸ secured to a shaft Q⁹. The latter also carries spur gears Q¹⁰, Q¹¹, Q¹² and Q¹³ of different diameters and having correspondingly different numbers of teeth. The shaft E² which extends through and is journalled in the frame of the device Q forms a support for a yoke shaped member or frame Q¹⁴, which may be moved angularly about and longitudinally of the shaft E². A counter shaft Q¹⁶ laterally displaced from but parallel to the shaft E² and journalled in the yoke Q¹⁴ carries a spur gear Q¹⁵ constantly in mesh with the teeth of an elongated gear E³ mounted in the shaft E². The shaft Q¹⁶ also carries a spur gear Q¹⁷ which is adapted to be moved into mesh with one of the gears Q¹⁰, Q¹¹, Q¹² and Q¹³ or out of mesh with all of these gears. The frame Q¹⁴ may be manipulated to bring about the engagement or disengagement of the gear Q¹⁷ with the gears Q¹⁰, Q¹¹, Q¹² and Q¹³ by means of a handle Q¹⁸ which projects through a slotted plate Q¹⁹. The latter is formed with four notches Q²⁰, Q²¹, Q²² and Q²³, so shaped that when the handle is at the bottom of one of these notches the gear Q¹⁷ will be in mesh with the corresponding ones of the gears Q¹⁰, Q¹¹, Q¹² and Q¹³. The plate is also formed with a notch $Q^{24}$ which is so shaped that when the handle $Q^{18}$ is received in the gear $Q^{17}$ it will not be in mesh with any of the gears $Q^{10}$, $Q^{11}$, $Q^{12}$ and $Q^{13}$. A spring $Q^{25}$ constantly urges the handle $Q^{18}$ into position in which it engages whatever of the notches it may then be entered in.

With the arrangement described it will be apparent that when the handle $Q^{18}$ is entered in the notch $Q^{20}$, the timing device E will operate to progressively advance the contact mechanism, including the plate $H^3$ and contacts H, H' and $H^2$ along the path of the index at one predetermined rate of speed. Similarly, when the handle 18 is entered in one of the other notches $Q^{21}$, $Q^{22}$ or $Q^{23}$ the contact mechanism will be moved along the path of movement of the meter index at a correspondingly different predetermined speed. When the handle $Q^{18}$ of the change speed gear is caught in the notch $Q^{24}$ the contact mechanism will be normally stationary, but may then be manually adjusted, as required, by rotating the knob $Q^{26}$ secured to the outer end of the shaft $Q^5$. Whether the contact mechanism is being continuously advanced at some predetermined rate by the timing device E, or is stationary whenever the depresser C is actuated and the meter index B correspondingly depressed, one or another of the movable contacts H, H' or $H^2$ will normally be in position to be engaged and depressed by the meter index B. When this occurs the corresponding furnace regulating element I, I' or $I^2$ will be energized to thereby either automatically adjust the furnace controlling valves or switches as required or to give a signal to the furnace attendant indicating to him what should be done to secure the proper furnace temperature.

When the arm carrying the adjustable contact mechanism reaches the limit of its movement under the action of the timing mechanism, and the guide pin $K^7$ engages the corresponding end of the arc shaped slot L' in the gear segment L, the yielding connection between the gear $Q^7$ and the shaft $Q^5$, formed by the friction clutch member $Q^6$, permits the contact mechanism to remain stationary even though the changed speed gear handle $Q^{18}$ is not then manipulated as it should be without interrupting the operation of the timing device E, and without preventing the latter from periodically actuating the depresser C.

While in accordance with the provisions of the statutes I have illustrated and described the best form of my invention now known to me, it will be apparent to those skilled in the art that changes may be made in the form of the apparatus disclosed without departing from the spirit of the invention set forth in the appended claims, and that certain features of my invention may sometimes be used with advantage without a corresponding use of other features.

Having now described my invention, what I claim as new and desire to secure by Letters Patent, is:

1. In a furnace regulating system, the combination with a thermo-electric device and an electric meter having a pivoted index for measuring the furnace temperature of a furnace regulating contact mechanism adjustable along the path of movement of said index, a timing mechanism, means actuated thereby for periodically bringing about an operative engagement between said index and contact mechanism, and means actuated by the time mechanism and including a frictional driving connection adapted to yield when said contact mechanism reaches the limit of its movement, for moving said contact mechanism along said path at a predetermined rate.

2. The combination with an electric meter having a pivoted index, of a pivoted arm, a contact mechanism carried by said arm and moved by the angular adjustment of the latter along the path of movement of the index, a timing mechanism, and means for angularly adjusting said arm comprising a stationary gear segment, a gear mounted on said arm in mesh with said segment, a shaft mounted on said arm, a second shaft coaxial with the pivotal axis of said arm, gearing connecting said two shafts and gearing connecting the first mentioned shaft and said gear.

3. The combination with an electric meter having a pivoted index, of a pivoted arm, a contact mechanism carried by said arm and moved by the angular adjustment of the latter along the path of movement of the index, a timing mechanism, and means for angularly adjusting said arm comprising a stationary gear segment, a gear mounted on said arm and in mesh with said segment, a shaft mounted on said arm, a second shaft co-axial with the pivotal axis of said arm, gearing connecting said two shafts, gearing connecting the first mentioned shaft and said gear, and a change speed gear connection between said second shaft and said timing mechanism.

4. In a furnace regulating apparatus the combination with a thermo-electric device responsive to the furnace temperature and an electric meter having a pivoted index for measuring the furnace temperature of a furnace regulating contact mechanism adjustable along the path of movement of the index, means for so adjusting said contact mechanism including a shaft adapted for manual rotation and operating when rotated to adjust said contact mechanism along said path, a timing mechanism, and a change speed gear connection adjustable to connect said timing mechanism to said shaft for operation at one or another of several predetermined speeds of rotation or to disconnect said shaft from said timing mechanism.

5. In a furnace regulating system, a meter having means for indicating furnace temperature, a device operated by furnace temperature for controlling said meter, a movable electrical contact mechanism including a plurality of contacts and a plurality of contactors movable respectively to said contacts, a plurality of circuits including respectively certain of said contacts and contactors, means for causing said contact mechanism to move in a given direction at a predetermined rate, and means for periodically shifting said indicating means to engage said contact mechanism, whereby the contactor corresponding to the position of said indicating means is actuated to engage its contact and close one of said circuits, and means to indicate at a distant point which of said contactors has been actuated.

6. In a furnace regulating system, the combination of an electrical instrument for indicating furnace temperature, a temperature responsive device for actuating said instrument, a plurality of controlled devices, a plurality of electrical circuits for respectively controlling said devices, a circuit selecting mechanism including pairs of contacts and contactors arranged to be operated by said instrument, and means for causing said circuit selecting mechanism to move in a predetermined manner to select one or another of said circuits to cause one of said devices to function.

7. In a furnace regulating system, the combination of an electrical temperature measuring instrument, a temperature responsive device for actuating said instrument, a plurality of controlled devices, means including an electrical contact mechanism for controlling said devices, said contact mechanism being operated by said electrical instrument and including pairs of contacts and contactors, an index or pointer for said instrument, and means for changing the position of said index and said contact mechanism with respect to each other to vary the operation of said controlled devices.

8. In a furnace regulating system, the combination of an electrical instrument for indicating furnace temperature, a temperature responsive device for actuating said instrument, a controlled device, an electrical circuit for causing said controlled device to function, said circuit including two terminals, a contact plate supporting said terminals in insulated relation and normally out of contact, means for causing said plate to travel in a predetermined manner, and means controlled by said electrical instrument for bringing said terminals into contact under certain predetermined temperature conditions to close said circuit to actuate said controlled device.

9. In a furnace regulating system, the combination of an electrical instrument for indicating furnace temperature, a temperature responsive device for actuating said instrument, a control mechanism, a plurality of electrical circuits for respectively causing said mechanism to function, a circuit selecting means including pairs of contacts and contactors, means for causing said circuit selecting means to travel in a predetermined path, and means controlled by said electrical instrument cooperating with the selecting means to select one or another of said circuits to cause said control mechanism to function in accordance with a predetermined temperature condition.

RICHARD P. BROWN.